United States Patent [19]

Goetz

[11] Patent Number: 4,931,843
[45] Date of Patent: Jun. 5, 1990

[54] HIGH VOLTAGE MEASUREMENT CAPACITOR

[76] Inventor: Bernhard Goetz, 55 W. 14th St., New York, N.Y. 10011

[21] Appl. No.: 385,232

[22] Filed: Jul. 25, 1989

Related U.S. Application Data

[63] Continuation-in-part of Ser. No. 259,247, Oct. 18, 1988, Pat. No. 4,879,628.

[51] Int. Cl.$^5$ .................... H01G 4/08; H01G 4/04
[52] U.S. Cl. ...................... 361/323; 361/327
[58] Field of Search ................ 361/323, 326, 327, 328

[56] References Cited

U.S. PATENT DOCUMENTS

| | | | |
|---|---|---|---|
| 1,952,158 | 3/1934 | Clark et al. | 361/323 |
| 3,829,742 | 8/1974 | Muller | 317/103 |
| 3,829,744 | 8/1974 | Raupach | 317/244 |
| 4,408,818 | 10/1983 | Markarian | 361/272 |
| 4,467,397 | 8/1984 | Thiel et al. | 361/313 |
| 4,618,914 | 10/1986 | Sato et al. | 361/323 |
| 4,654,751 | 3/1987 | Tokura et al. | 361/323 |

OTHER PUBLICATIONS

F. K. Harris, Electrical Measurements (©1952: John Wiley & Sons, Inc., New York), pp. 678–679.
B. Hague, Alternating Current Bridge Methods (©1957, Sir Isaac Pitman & Sons, Ltd., London), pp. 176–182.

Primary Examiner—Donald A. Griffin
Attorney, Agent, or Firm—Peter L. Michaelson

[57] ABSTRACT

A three-terminal capacitor having high and low voltage electrodes coaxially aligned in a housing which serves as a ground plane includes a non-gaseous dielectric material filling the cavity of the housing. In the preferred embodiments, the dielectric is either a suitable oil or plastic. A source of voltage, that can be used to power for example an external electrical measuring device, can be generated by arranging a tertiary electrode proximate to the high voltage electrode and suitably selecting the ratio of surface areas of the tertiary and high voltage electrodes to produce sufficient current to power the device. Various embodiments of the capacitor also include and internal current transformer which provides a current signal indicative of series current flow through the capacitor. This current signal and the signal appearing on the low voltage electrode can be used to readily provide an indication of the amount of power supplied by a power transmission line to a load situated downstream of the capacitor.

20 Claims, 4 Drawing Sheets

HIGH VOLTAGE MEASUREMENT CAPACITOR

CROSS REFERENCE TO RELATED APPLICATION

This patent application is a continuation-in-part application of my U.S. patent application Ser. No. 07/259,247 filed Oct. 18, 1988 and titled "HIGH VOLTAGE MEASUREMENT CAPACITOR", now U.S. Pat. No. 4,879,628.

FIELD OF THE INVENTION

This invention relates generally to a high voltage capacitor and, more specifically, to a three-terminal, solid-filled or liquid-filled high voltage capacitor adapted for measurements in a field environment.

BACKGROUND OF THE INVENTION

In a controlled environment such as a laboratory setting, it is a common practice to utilize a gas-filled, three-terminal type capacitor for measuring high voltages. Such a capacitor exhibits a relatively low loss factor and is not influenced by external fields, both characteristics being useful to effect precise measurements in laboratory test set-ups.

Representative of these conventional capacitor types is the arrangement disclosed in U.S. Pat. No. 3,829,742 issued to Muller on Aug. 13, 1974. In this arrangement, cylindrically-shaped high and low voltage electrodes are disposed in coaxial relationship within a sealed chamber or housing. The high voltage electrode is suspended from a combined high voltage bushing-lead structure which forms the top of the chamber. The low voltage electrode, which encompasses the high voltage electrode, rests on a layer of insulation material seated on a floor plate of the chamber. A low voltage lead is introduced into the chamber through an insulated bushing formed integrally with the wall of the chamber. The chamber is grounded to mitigate the effects of external fields. The interior of the chamber is filled with a gas under pressure.

This type of gas-filled capacitor exhibits a phenomenon, called "statistical breakdown" in the high-voltage art, wherein an internal flashover or arcing between the electrodes may occur at a random time. The flashover becomes, in effect, a short between the electrodes, leading to a very high surge of current from the high voltage line attached to the capacitor through the electrodes to ground. In turn, this current flow generates heat internal to the capacitor, thereby causing further pressurization of the gas. If left unchecked as is the case with a field installation, specifically a connection to a power line, an explosion may occur. In the laboratory, it is possible to substantially reduce such current surges by utilizing external current-limiting circuitry. Because of controlled conditions and stabilizing efforts possible in the laboratory, dangerous situations such as explosions are precluded.

However, while useful in the laboratory, the gas capacitor may be susceptible to the deleterious effects of a harsh field environment, particularly in revenue metering applications wherein the capacitor is permanently installed on a customer premises. For instance, because of ambient temperature variations, the capacitor components are subjected to degrading influences over time, thereby increasing the likelihood of a flashover. Because of cost and complexity, it is impractical to deploy sophisticated current limiting circuitry in the field setting that would ordinarily be provided in the laboratory. Moreover, pressurized gas components attached to a power line are bulky and complicate the accessibility and work activity of craft personnel.

Also, in the laboratory, an independent voltage source is readily available to energize ancillary circuitry which may then be used in support of measurement applications utilizing the three-terminal capacitor. However, an independent voltage source often does not exist in the field. As such, it would be preferable to derive a voltage signal, for use by the ancillary circuits, directly from the high voltage source being measured.

In revenue metering applications for power utility companies, it is necessary to derive both a current and voltage indicative of power usage in order to measure the usage. Current detection has been effected with a current transformer which is not formed integrally with the three-terminal capacitor. This is costly and proliferates the number of distinct components placed along the transmission line.

SUMMARY OF THE INVENTION

These shortcomings as well as other limitations in the art are obviated, in accordance with the present invention, by a three-terminal capacitor arrangement which in its basic form has a non-gaseous dielectric that fills the housing.

Broadly speaking, the illustrative embodiments of the capacitor include both high and low voltage electrodes aligned in energy transfer relation to form the plates of the capacitor. The electrodes are disposed in a sealed housing which forms a ground plane. The housing is filled with a non-gaseous dielectric material, typically either oil or polypropylene in the preferred embodiments.

To derive a voltage signal for ancillary circuitry, a tertiary electrode is interposed in the energy transfer path of the capacitor plates. To generate a current signal indicative of the current flow in the associated power line, a core encompasses an appropriate high voltage (HV) lead carrying the power line current. The voltage signal and current signal may be combined to obtain power usage. Also, temperature variations can be compensated by using a thermistor disposed within the housing.

BRIEF DESCRIPTION OF THE DRAWINGS

The structure and operation of this invention will be better understood by considering the detailed description of the illustrative embodiments thereof, which follow, in conjunction with the accompanying drawings, in which.

DETAILED DESCRIPTION

Figure 1:
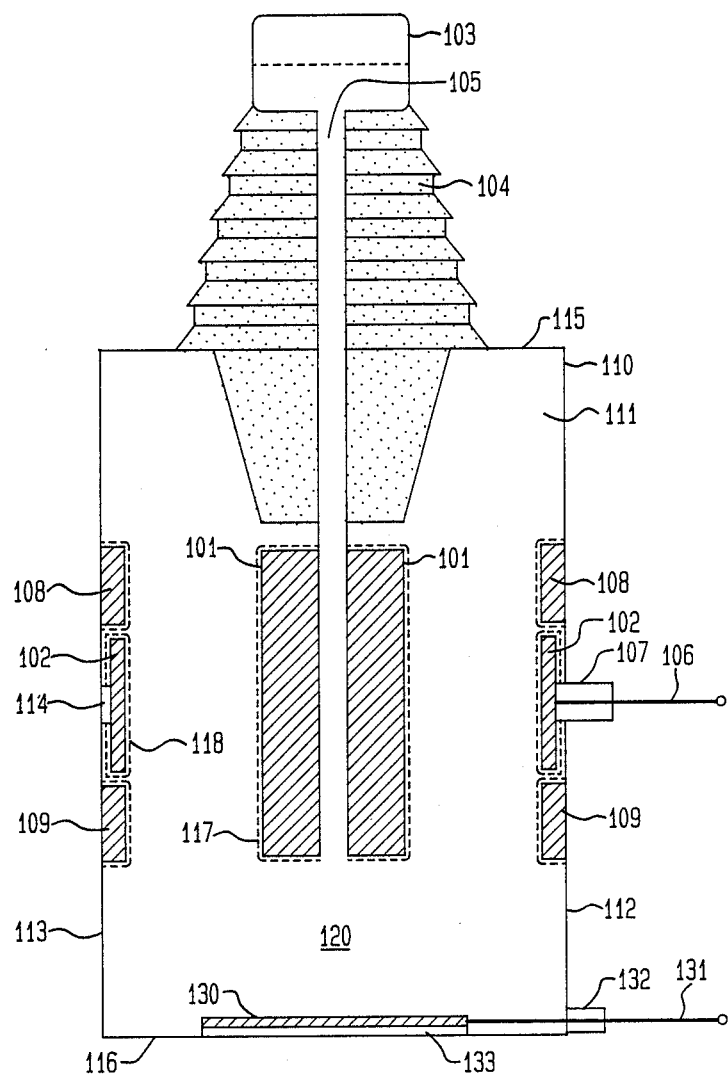
FIG. 1 is a cross-sectional view of one illustrative embodiment of a three-terminal capacitor in accordance with the teachings of the present invention.

Three-terminal capacitor 100 shown in cross-sectional view in FIG. 1 is an illustrative embodiment of one aspect of the present invention. In this depiction, capacitor 100 includes: hollow, cylindrically-shaped metallic housing 110 defining a cylindrical cavity 111 as being the volume enclosed by walls 112, 113, 115 and 116 of housing 110; cylindrically-shaped high voltage (HV) electrode 101 formed integrally with vertically-extending metallic connection pipe 105 and disposed proximate to the center of cavity 111; and cylindrically-shaped low voltage (LV) electrode 102 located proximate to vertical walls 112 and 113 of housing 110. Hollow pipe 105 is introduced into cavity 111 via HV bushing 104 which is formed integrally with top surface 115 of housing 110. Hollow pipe 105 has expansion reservoir 103 formed integrally with its top end. Reservoir 103, being metallic, also serves as the connection point for the HV power line (not shown) being tapped or measured. LV insulator bushing 107 couples LV lead 106 to LV electrode 102 through housing wall 112. Insulator portion 114 fixedly maintains LV electrode 102 in non-contact relation with left wall 113. Cylindrically-shaped guard electrodes 108 and 109, adjacent to the top and bottom portions of LV electrode 102, respectively, are in contact with walls 112 and 113 and assure a uniform electric field via the Faraday shield effect between HV electrode 101 and LV electrode 102.

For a field-grade type capacitor, all of cavity 111, pipe 105 and part of reservoir 103—such as up to a level indicated by a dashed line shown in the reservoir—are filled with either a liquid or solid dielectric shown by reference numeral 120 in FIG. 1. Transformer oil such as General Electric 10C oil is one example of a suitable liquid dielectric. Polypropylene is an example of a suitable plastic-type solid dielectric. In the liquid or oil-based implementation, expansion reservoir 103 is of sufficient size to contain the expanded volume of liquid caused by a high operating or ambient temperature. In the solid-based implementation, expansion reservoir 103 may be reduced in size relative to the size required of a liquid-based version; however, reservoir 103 is still required because some materials, such as polypropylene, exhibit a significant temperature coefficient of expansion. A positive pressure is generated by the height of the column of dielectric in pipe 105 and reservoir 103. This pressure prevents the formation of voids, that is, bubbles in the dielectric, thereby mitigating dangerous situations such as a flashover condition.

Figure 2:
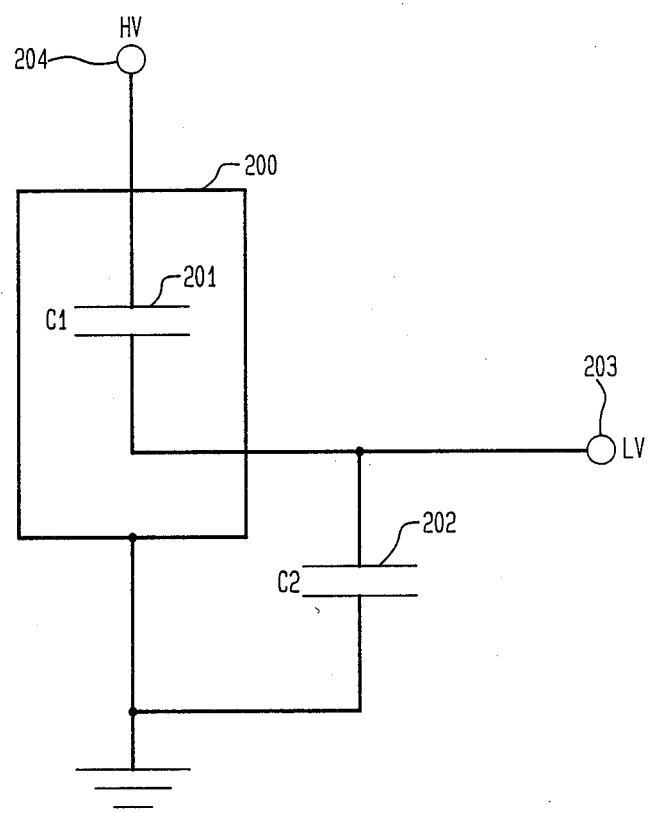
FIG. 2 is a schematic diagram of one arrangement for utilizing the capacitor of FIG. 1 in a measurement circuit.

The schematic diagram of FIG. 2 indicates how field-type capacitor 100 may be used in practice. The capacitance of capacitor 100 in FIG. 1 is represented in FIG. 2 by capacitor 201 having capacitance value C1. Another conventional capacitor 202 having capacitance value C2 is connected in series with capacitor 201. Ground plane 200 is shown as encompassing capacitor 201. For the capacitor of FIG. 1, ground plane 200 may be identified physically with housing 110. As an example of the voltage reduction capability of capacitor 201, some typical voltage values are considered. If the value of capacitor C1 equals 50 picofarads (pf) and the value of capacitor C2 equals 1 microfarad ($\mu$f), and a 135 kV AC line serves as input to HV terminal 204, then the voltage appearing at LV terminal 203 is approximately 6.749 V, which means that basically the full voltage is dropped across capacitor 201.

It may be necessary in solid dielectric capacitor structures to apply a pliable bonding agent, indicated by reference numerals 117 and 118 (as shown in FIG. 1), to electrodes 101 and 102, respectively, to preclude the formation of air-gaps or voids between the metal electrodes and the solid dielectric. Bonding agents 117 and 118, placed as a thin layer on the electrodes, serves as a "dielectric bridge" between the metal of the electrodes and the solid dielectric. The properties and utility of such an agent, commonly referred to in the high voltage art as a "semiconductor" compound, are well-known along with its formulation. The bonding agent may also be applied to guard electrodes 108 and 109, as shown by the corresponding circumscribing dashed lines in FIG. 1.

Figure 3:
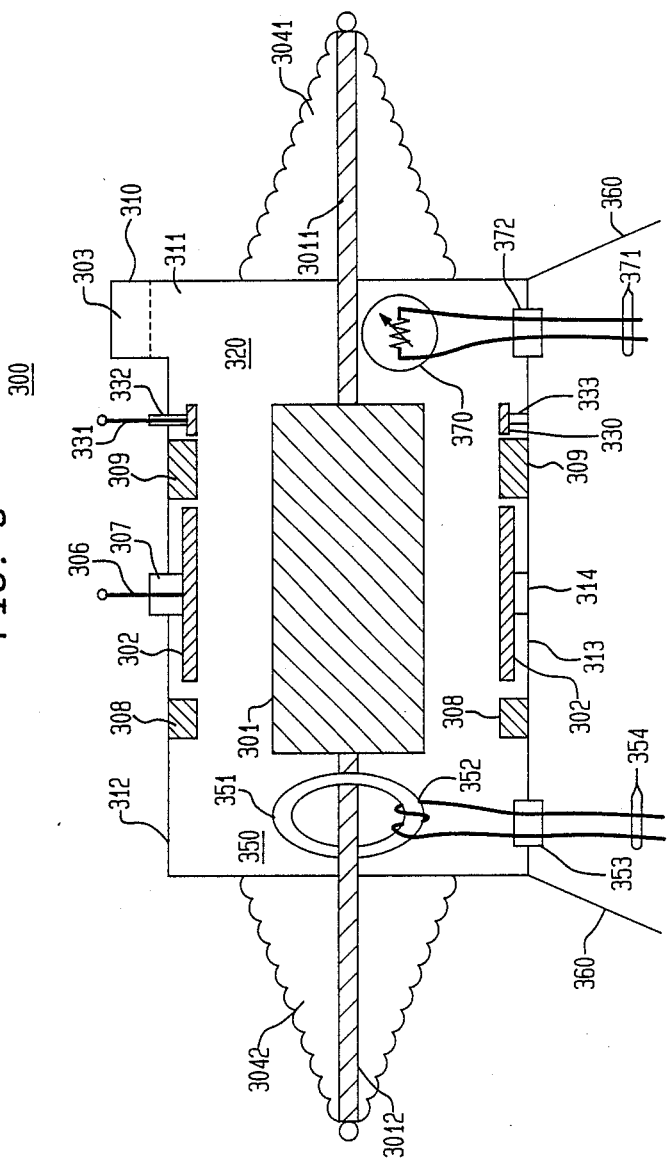
FIG. 3 is a cross-sectional view of another illustrative embodiment of the inventive capacitor and which depicts additional components that may be used to derive signals for measuring power usage.

FIG. 3 shows in cross-sectional view another embodiment of three-terminal capacitor 300 illustrating other aspects of the present invention. The type of capacitor represented by FIG. 3 is useful for in-line or series insertion in the path of a transmission line. Similar components from FIG. 1 also shown in FIG. 3 have reference numerals incremented by 200 to facilitate comparison of the two structures. Thus, for example, LV electrode 102 in FIG. 1 has a counterpart in FIG. 3 shown as LV electrode 302. A bonding agent, shown in FIG. 1 by indicia 117, 118, is not shown in FIG. 3 but is assumed to be applied to all electrodes of FIG. 3 in the same manner as described with respect to FIG. 1.

Capacitor 300 has a horizontal orientation and rests on pedestals 360. Housing 310 defines cavity 311 as the interior of housing 310. Reservoir 303 is formed as a protrusion in the upper right corner of housing 310. HV and LV electrodes 301 and 302, respectively, are in coaxial relationship and are disposed in energy transfer relation in cavity 311. Electrode 301 is connected to right and left heavy-duty leads 3011 and 3012 via HV bushings 3041 and 3042, respectively. LV lead 306 connects to LV electrode 302 through LV bushing 307. Cylindrical guard electrodes 308 and 309 are shown proximate to LV electrode 302 and are in electrical contact with walls 312, 313. Dielectric 320, either liquid or solid, fills cavity 311 and part of reservoir 303, such as up to a level indicated by the dashed line shown therein.

To this point in the discussion, components 130–133 in FIG. 1 and components 330–333 of FIG. 3 have not been described; these components, which will now be described, serve as a means for tapping the power supplied to the HV electrode 101 and 301 so as to provide a voltage signal to energize external, ancillary circuitry, e.g. measurement circuitry. With respect to FIG. 1, tertiary electrode 130 is disc-shaped and it rests on a layer of insulation material 133 on floor 116 of housing 110. Signal lead 131 connects to electrode 130 through signal bushing 132 formed integrally with wall 112. Regarding FIG. 3, tertiary electrode 330 is cylindrically-shaped and arranged adjacent to guard electrode 309 and oppositely situated from the HV electrode in coaxial relation with both the LV and HV electrodes. Signal lead 331 is connected to electrode 330 via bushing 332 in wall 312. Insulated spacer 333 keeps electrode 330 from contacting wall 313. With respect to electrical properties, the ratio of the surface area of the signal electrode (130 or 330) to the surface area of the HV electrode (101 or 301) should be selected to produce sufficient output current to power an external device.

Also shown in FIG. 3 is current transformer 350 comprising ring core 351 and secondary winding 352. Core 351 encompasses heavy-duty lead 3012 which passes therethrough and serves as the primary of current transformer 350. Wires 354 form secondary winding 352 and are introduced into cavity 311 via bushing 353. The physical and electrical parameters of core 351 and the number of turns of secondary 352 may be conveniently chosen to provide an indication of the series current flow through leads 3011 and 3012 for metering purposes. The current available on leads 354, when multiplied by the signal voltage present on lead 306, results in an indication of the power usage.

Also shown in FIG. 3 is thermistor 370 which is disposed in cavity 311 so as to compensate for temperature variations occurring within housing 310. Thermistor 370 has an appropriate temperature coefficient so this characteristic may be used to offset the temperature coefficient of dielectric 320 via external stabilization circuitry. Changes in the resistance of thermistor 370 due to temperature variations are provided by leads 371 emanating from housing 310 through bushing 372. Generally speaking, a thermistor will only be required when the dielectric has a high temperature coefficient, such as that commonly found with oil dielectrics.

Figure 4:
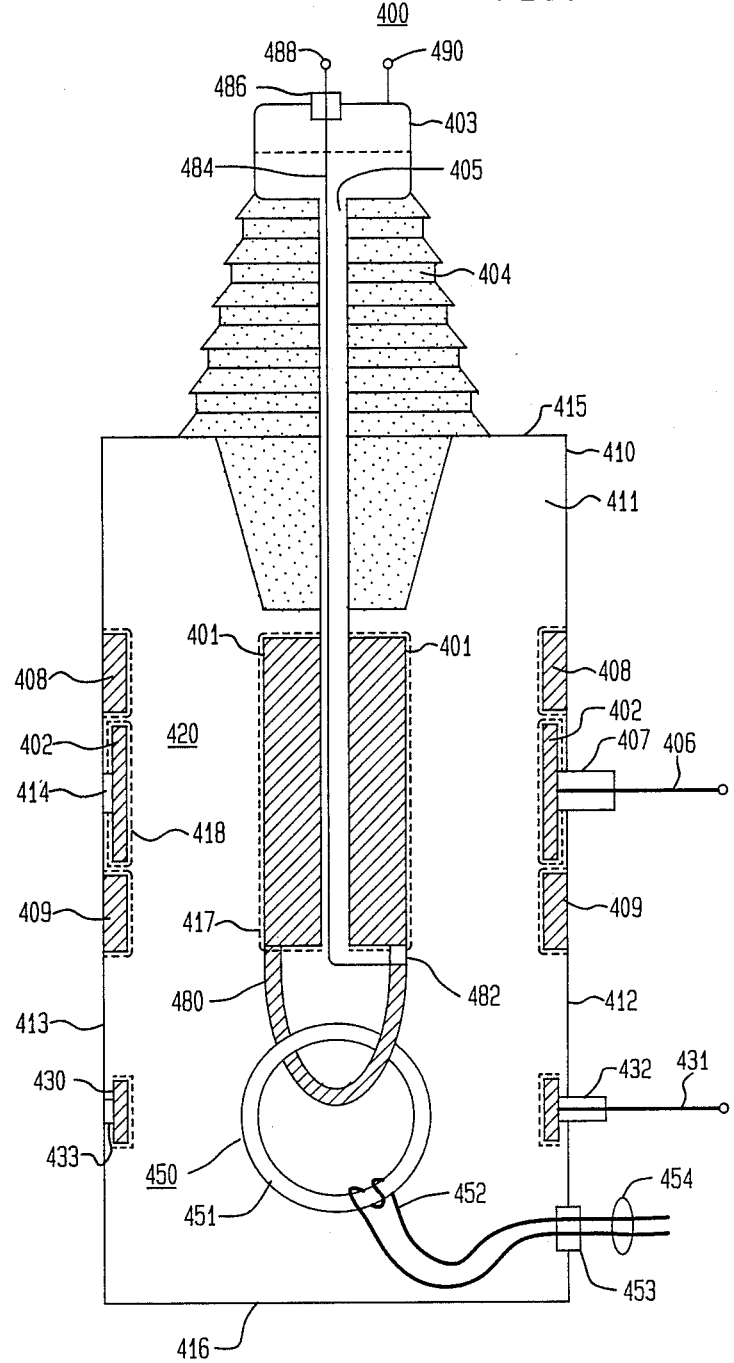
FIG. 4 is a cross-sectional view of another illustrative embodiment of the inventive capacitor which is particularly useful for in-line or series insertion in the path of a transmission line and which also includes components that may be used to derive signals for measuring power usage.

FIG. 4 shows a cross-sectional view of another illustrative embodiment of my inventive capacitor. This particular embodiment, i.e. capacitor 400, is particularly useful for in-line or series insertion in the path of a transmission line and also includes components that may be used to derive signals for measuring power usage. As shown, capacitor 400 includes: hollow, cylindrical-shaped metallic housing 410 that defines a cylindrical cavity 411 as being the volume enclosed by walls 412, 413, 415 and 416 of housing 410; cylindrically-shaped HV electrode 401 formed integrally with vertically-extending metallic connection pipe 405 and disposed proximate to vertical walls 412 and 413 of housing 410. Hollow pipe 405 is introduced into cavity 411 via HV bushing 404 which is formed integrally with top surface 415 of housing 410. Hollow pipe 405 has expansion reservoir 403 formed integrally with its top end. Reservoir 403, being metallic, also serves as a connection point, either through itself or through connection 490 affixed thereto, for the HV power line (not shown) being tapped or measured. LV insulator bushing 407 couples LV lead 406 to LV electrode 402 through housing wall 412. Insulator portion 414 fixedly maintains LV electrode 402 in non-contact relation with left wall 413. Cylindrically-shaped guard electrodes 408 and 409, adjacent to the top and bottom portions of LV electrode 402, respectively, are in contact with walls 412 and 413 and assure a uniform electric field via the Faraday shield effect between HV electrode 401 and LV electrode 402.

For a field-grade type capacitor, all of cavity 411, pipe 405 and part of reservoir 403—such as up to a level indicated by a dashed line shown in the reservoir—are filled with either a liquid or solid dielectric shown by reference numeral 420 in FIG. 4. Transformer oil such as General Electric 10C oil is one example of a suitable liquid dielectric. Polypropylene is an example of a suitable plastic-type solid dielectric. In the liquid or oil-based implementation, expansion reservoir 403 is of sufficient size to contain the expanded volume of liquid caused by a high operating or ambient temperature. In the solid-based implementation, expansion reservoir 403 may be reduced in size relative to the size required of a liquid-based version; however, reservoir 403 is still required because some materials, such as polypropylene, exhibit a significant temperature coefficient of expansion. A positive pressure is generated by the height of the column of dielectric in pipe 405 and reservoir 403. This pressure prevents the formation of voids, that is, bubbles in the dielectric, thereby mitigating dangerous situations such as a flashover condition.

Again, it may be necessary when using a solid dielectric within capacitor 400 to apply a pliable bonding agent, indicated by reference numerals 417 and 418 (as shown in FIG. 4), to electrodes 401 and 402, respectively, to preclude the formation of air-gaps or voids between the metal electrodes and the solid dielectric. Here too bonding agents 417 and 418, as in the case of the embodiments shown in FIGS. 1 and 3, are placed as a thin layer on the electrode and serve as a "dielectric bridge" between the metal of the electrodes and the solid dielectric. The properties and utility of such an agent, commonly referred to in the high voltage art as a "semiconductor" compound, are well-known along with its formulation. The bonding agent may also be applied to guard electrodes 408 and 409, as shown by the corresponding circumscribing dashed lines in FIG. 4.

Components 430–433 shown in FIG. 4 serve as a means for tapping the power supplied to HV electrode 401 in order to provide a voltage signal again for use in energizing external, ancillary circuitry, e.g. suitable measurement circuitry. In particular, tertiary electrode 430 is cylindrically-shaped and arranged adjacent to guard electrode 409 and oppositely situated from HV electrode 401 and in coaxial relation with both the LV and HV electrodes. Signal lead 431 is connected to electrode 430 via bushing 432 situated in wall 412. Insulated spacer 433 keeps electrode 430 from contacting wall 413. With respect to electrical properties, the ratio of the surface area of tertiary electrode 430 to the surface area of HV electrode 401 should be selected to produce sufficient output current in lead 431 to power a given external device, e.g. suitable electrical measurement equipment.

FIG. 4 also shows current transformer 450 comprising ring core 451 and secondary winding 452 wound therearound. Core 451 encompasses heavy-duty lead 480 which passes through ring core 451 and thereby serves as the primary of current transformer 450. One end of lead 480 is electrically connected to pipe 405 and for convenience illustratively to electrode 401 which is also connected thereto. Wires 454 form secondary winding 452 and are introduced into cavity 411 via insulating bushing 453. The physical and electrical parameters of core 451 and the number of turns of secondary winding 452 may be conveniently chosen to provide an indication of the series current flow through leads 480 and 484, and therethrough to connections 488 and 490, for metering purposes. The current available on leads 454, when multiplied by the signal voltage present on lead 406, results in an indication of the power usage. Insulator 482 isolates one end of lead 480 from electrode 401. The current in lead 480 is carried via insulated lead 484 through insulating bushing 486 to output HV connection 488. Bushing 486 serves to insulate input and output HV connections 488 and 490 from each other. Connection 490 serves a convenient input electrical connection, via pipe 405, to electrode 401. Through input and output HV connections 488 and 490, capacitor 400 can be wired in series with a power line to provide signals indicative of power usage. The designations of connections 488 and 490 as being input and output are arbitrary and will merely affect the polarity of the current output signal that appears on wires 454.

It is to be further understood that the capacitor structures described herein are not limited to the specific embodiments shown by way of illustration but may assume other embodiments limited only by the scope of the appended claims.

I claim:

1. A capacitor for high voltage measurements comprising:
   a hollow housing defining a cavity:
   a high voltage (HV) electrode disposed in the housing, a HV bushing attached to the housing and first and second HV leads introduced into the housing via the HV bushing, wherein an internal end of the first HV lead couples to the HV electrode and an external end of the first HV lead terminates as a first HV connection, the internal end of the second HV lead couples to one end of a primary lead and the external end of the second HV lead terminates as a second HV connection electrically insulated from said first HV connection, wherein another end of the primary lead is electrically connected either to the internal end of said first HV lead or to said HV electrode, said first HV lead being hollow and including a reservoir formed at the external end thereof, and wherein the HV electrode is hollow and said second HV lead is insulated and routed through said first HV lead,
   a low voltage (LV) electrode disposed in the housing an encompassing the HV electrode, a LV bushing attached to the housing and a LV lead introduced into the cavity via the LV bushing, wherein the internal end of the LV lead couples to the LV electrode and an external end of the LV lead forms a LV terminal;
   a current transformer situated within said cavity and formed of a core, the primary lead which is oriented to pass through said core, and a secondary winding wound around said core;
   leads for routing a current signal appearing on said secondary winding from the cavity; and
   a non-gaseous dielectric material filling the cavity including the interelectrode gap between the HV electrode and the LV electrode.

2. The capacitor recited in claim 1 wherein the dielectric is a liquid material that fills the cavity including the interelectrode gap, a portion of the reservoir and the hollows in the first HV lead and said HV electrode.

3. The capacitor recited in claim 2 wherein said dielectric is oil.

4. The capacitor recited in claim 1 wherein said dielectric is plastic.

5. The capacitor recited in claim 4 further comprising a semiconductor compound applied to the HV, LV and tertiary electrodes.

6. The capacitor recited in claim 1 further comprising a guard electrode which is disposed in said housing and electrically connected thereto and is situated adjacent to and coaxially aligned with said low voltage electrode.

7. The capacitor recited in claim 6 wherein the dielectric is a liquid material that fills the cavity including the interelectrode gap, a portion of the reservoir and the hollows in the first HV lead and said HV electrode.

8. The capacitor recited in claim 7 wherein said dielectric is oil.

9. The capacitor recited in claim 6 wherein said dielectric is plastic.

10. The capacitor recited in claim 9 further comprising a semiconductor compound applied to the HV, LV and tertiary electrodes.

11. The capacitor recited in claim 1 further comprising a tertiary electrode disposed in said housing and being in an energy transfer relationship with said HV electrode, and a tertiary bushing formed integrally with said housing, and a tertiary lead introduced into said cavity via said tertiary bushing, said tertiary electrode arranged to provide a pre-determined voltage signal via said tertiary lead for a given voltage applied to said first HV lead.

12. The capacitor recited in claim 11 wherein the dielectric is a liquid material that fills the cavity including the interelectrode gap, a portion of the reservoir and the hollows in the first HV lead and said HV electrodes.

13. The capacitor recited in claim 12 wherein said dielectric is oil.

14. The capacitor recited in claim 11 wherein said dielectric is plastic.

15. The capacitor recited in claim 14 further comprising a semiconductor compound applied to the HV, LV and tertiary electrodes.

16. A capacitor for high voltage measurements comprising:
   a hollow housing defining a cavity:
   a high voltage (HV) electrode disposed in the housing, a HV bushing attached to the housing and first and second HV leads introduced into the housing via the HV bushing, wherein an internal end of the first HV lead couples to the HV electrode and an external end of the first HV lead terminates as a first HV connection, the internal end of the second HV lead couples to one end of a primary lead and the external end of the second HV lead terminates as a second HV connection electrically insulated from said first HV connection, wherein another end of the primary lead is electrically connected to either said first HV lead or to said HV electrode, said first HV lead being hollow and including a reservoir formed at the external end thereof, and wherein the HV electrode is hollow and said second HV lead is insulated and routed through said first HV lead,
   a low voltage (LV) electrode disposed in the housing an encompassing the HV electrode, a LV bushing attached to the housing and a LV lead introduced into the cavity via the LV bushing, wherein the internal end of the LV lead couples to the LV electrode and an external end of the LV lead forms a LV terminal;
   a current transformer situated within said cavity and formed of a core, the primary lead which is oriented to pass through said core and a secondary winding wound around said core;
   leads for routing a current signal appearing on said secondary winding from the cavity; and
   a liquid dielectric material filling the cavity including the interelectrode gap between the HV electrode and the LV electrode, a portion of the reservoir and the hollows in the first HV lead and said HV electrode.

17. The capacitor recited in claim 16 further comprising a guard electrode which is disposed in said housing and electrically connected thereto and is situated adjacent to and coaxially aligned with said low voltage electrode.

18. The capacitor recited in claim 17 wherein said dielectric is oil.

19. The capacitor recited in claim 16 further comprising a tertiary electrode disposed in said housing and being in an energy transfer relationship with said HV electrode, and a tertiary bushing formed integrally with said housing, and a tertiary lead introduced into said cavity via said tertiary bushing, said tertiary electrode arranged to provide a pre-determined voltage signal via said tertiary lead for a given voltage applied to said first HV lead.

20. The capacitor recited in claim 19 wherein said dielectric is oil.

* * * * *